US008537780B2

(12) United States Patent
Karaoguz et al.

(10) Patent No.: US 8,537,780 B2
(45) Date of Patent: *Sep. 17, 2013

(54) SYSTEM AND METHOD FOR PROVIDING A MESH NETWORK USING A PLURALITY OF WIRELESS ACCESS POINTS (WAPS)

(75) Inventors: Jeyhan Karaoguz, Irvine, CA (US); Nambirajan Seshadri, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 432 days.

This patent is subject to a terminal disclaimer.

(21) Appl. No.: 12/872,141

(22) Filed: Aug. 31, 2010

(65) Prior Publication Data

US 2011/0026487 A1  Feb. 3, 2011

Related U.S. Application Data

(63) Continuation of application No. 10/606,565, filed on Jun. 26, 2003, now Pat. No. 7,787,419.

(60) Provisional application No. 60/433,094, filed on Dec. 13, 2002, provisional application No. 60/435,984, filed on Dec. 20, 2002.

(51) Int. Cl.
*H04Q 7/00* (2006.01)
*H04Q 7/20* (2006.01)

(52) U.S. Cl.
USPC ............ 370/331; 455/436; 455/437; 455/439

(58) Field of Classification Search
None
See application file for complete search history.

(56) References Cited

U.S. PATENT DOCUMENTS

| 5,396,541 | A | 3/1995 | Farwell et al. |
|---|---|---|---|
| 5,640,678 | A | 6/1997 | Iskikawa et al. |
| 5,659,596 | A | 8/1997 | Dunn |
| 5,915,221 | A | 6/1999 | Sawyer et al. |
| 5,940,598 | A | 8/1999 | Strauss et al. |
| 5,953,320 | A | 9/1999 | Williamson et al. |
| 5,970,410 | A | 10/1999 | Carney et al. |
| 6,081,523 | A | 6/2000 | Merchant et al. |
| 6,108,323 | A | 8/2000 | Gray |

(Continued)

FOREIGN PATENT DOCUMENTS

| EP | 1059773 | 12/2000 |
|---|---|---|
| WO | 94/28645 | 12/1994 |
| WO | 97/31487 | 8/1997 |

OTHER PUBLICATIONS

European Search Report corresponding to EP App. Serial No. 04011698.0-1249 dated Feb. 12, 2010.

*Primary Examiner* — Ayaz Sheikh
*Assistant Examiner* — Blanche Wong
(74) *Attorney, Agent, or Firm* — Thomas Horstemeyer, LLP

(57) ABSTRACT

A first access point located in a first cell may be coupled to a second access point located in a second cell. Service may be initially provided to an access device by the first access point cell. The access device may subsequently be serviced by a second access point whenever a signal for the access device falls below a specified threshold level. The second cell may be a neighboring cell, which may be located adjacent to the first cell. A first signal may be transmitted from a first beamforming antenna coupled to the first access point, to the second access point via an uplink channel. Similarly, a second signal may be transmitted from a second beamforming antenna coupled to the second access point, to the first access point via a downlink channel. The uplink and downlink channels may be a backhaul channel.

60 Claims, 10 Drawing Sheets

(56) References Cited

U.S. PATENT DOCUMENTS

| | | |
|---|---|---|
| 6,119,005 A | 9/2000 | Smolik |
| 6,154,652 A | 11/2000 | Park et al. |
| 6,216,002 B1 | 4/2001 | Holmring |
| 6,219,346 B1 | 4/2001 | Maxemchuk |
| 6,272,351 B1 | 8/2001 | Langston et al. |
| 6,329,902 B1 | 12/2001 | Lee et al. |
| 6,370,380 B1 | 4/2002 | Norefors et al. |
| 6,505,043 B1 | 1/2003 | Aihara |
| 6,587,680 B1 | 7/2003 | Ala-Laurila et al. |
| 6,760,778 B1 | 7/2004 | Nelson et al. |
| 6,947,768 B2 | 9/2005 | Adachi et al. |
| 6,956,824 B2 | 10/2005 | Mark et al. |
| 7,092,714 B2 | 8/2006 | Noll et al. |
| 2001/0012279 A1 | 8/2001 | Haumont et al. |
| 2002/0077151 A1 | 6/2002 | Matthews et al. |

SYSTEM AND METHOD FOR PROVIDING A MESH NETWORK USING A PLURALITY OF WIRELESS ACCESS POINTS (WAPS)

CROSS-REFERENCE TO RELATED APPLICATIONS/INCORPORATION BY REFERENCE

This application is a continuation of U.S. application Ser. No. 10/606,565 filed Jun. 26, 2003 now U.S. Pat. No. 7,787,419 which in turn makes reference to, claims priority to, and claims the benefit of U.S. Provisional Patent Application Ser. No. 60/433,094 entitled "Method and System for Providing Bandwidth Allocation and Sharing in a Hybrid Wired/Wireless Network" filed on Dec. 13, 2002; and U.S. Provisional Application Ser. No. 60/435,984 entitled "Communication System and Method in a Wireless Local Area Network" filed on Dec. 20, 2002.

The above stated applications are filed concurrently herewith, and are all incorporated herein by reference in their entirety.

FIELD OF THE INVENTION

Embodiments of the present application relate generally to hybrid wired/wireless networking, and more particularly to a method and system for providing a mesh network using a plurality of wireless access points.

BACKGROUND OF THE INVENTION

The Open Systems Interconnection (OSI) model promulgated by the International standards organization (ISO) was developed to establish standardization for linking heterogeneous computer and communication systems. The OSI model describes the flow of information from a software application of a first computer system to a software application of a second computer system through a network medium. FIG. 1a is a block diagram 100 of the OSI model. Referring to FIG. 1a, the OSI model has seven distinct functional layers including layer 7, an application layer 114; layer 6, a presentation layer 112; layer 5, a session layer 110; layer 4, a transport layer 108, layer 3, a network layer 106; layer 2: a data link layer 104; and layer 1, a physical layer 102. The physical layer 102 may further include a physical layer convergence procedure (PLOP) sublayer 102b and a physical media dependent sublayer 102a. The data link layer 104 may also include a Medium access control (MAC) layer 104a.

In general, each OSI layer describes certain tasks which are necessary for facilitating the transfer of information through interfacing layers and ultimately through the network. Notwithstanding, the OSI model does not describe any particular implementation of the various layers. OSI layers 1 to 4 generally handle network control and data transmission and reception, generally referred to as end-to-end network services. Layers 5 to 7 handle application issues, generally referred to as application services. Specific functions of each layer may vary depending on factors such as protocol and/or interface requirements or specifications that are necessary for implementation of a particular layer. For example, the Ethernet protocol may provide collision detection and carrier sensing in the physical layer. Layer 1, the physical layer 102, is responsible for handling all electrical, optical, opto-electrical and mechanical requirements for interfacing to the communication media. Notably, the physical layer 102 may facilitate the transfer of electrical signals representing an information bitstream. The physical layer 102 may also provide services such as, encoding, decoding, synchronization, clock data recovery, and transmission and reception of bit streams.

The PLOP layer 102b may be configured to adapt and map services provided by the physical layer 102 to the functions provided by the device specific PMD sublayer 102a. Specifically, the PLOP layer 102b may be adapted to map PHY sublayer service data units (PDSUs) into a suitable packet and/or framing format necessary for providing communication services between two or more entities communicating via the physical medium. The PMD layer 102a specifies the actual methodology and/or protocols which may be used for receiving and transmitting via the physical medium. The MAC sublayer 104a may be adapted to provide, for example, any necessary drivers which may be utilized to access the functions and services provided by the PLOP sublayer 102b. Accordingly, higher layer services may be adapted to utilize the services provided by the MAC sublayer 104a with little or no dependence on the PMD sublayer 102a.

802.11 is a suite of specifications promulgated by the Institute of Electrical and Electronics Engineers (IEEE), which provide communication standards for the MAC and physical (PHY) layer of the OSI model. The 801.11 standard also provides communication standards for wired and wireless local area networks (WLANs). More specifically, the 802.11 standard specifies five (5) types of physical layers for WLANs. These include, frequency hopping spread spectrum (FHSS), direct sequence spread spectrum (DSSS), infrared (IR) communication, high rate direct sequence spread spectrum spread spectrum (HR-DSS) and orthogonal frequency division multiplexing (OFDM). The 802.11 standard also provides a PLOP frame format for each of the specified PHY layers.

Over the past decade, demands for higher data rates to support applications such as streaming audio and streaming video, have seen Ethernet speeds being increased from about 1-2 megabit per second (Mbps), to 10 Mbps, to 100 Mbps, to 1 gigabit per second (Gbps) to 10 Gbps. Currently, there are a number of standards in the in the suite of specifications, namely 802.11b, 802.11a and 802.11g which have been adapted to facilitate the demands for increased data rates. The 802.11g standard for example, provides a maximum data rate of about 54 Mbps at a transmitter/receiver range of 19 meters (m) in a frequency range of 2.4 GHz to 2.4835 GHz. The 802.11b standard for example, provides a maximum data rate of about 11 Mbps at a transmitter/receiver range of 57 meters (m) in a frequency range of 2.4 GHz to 2.4835 GHz. Finally, the 802.11a standard for example, may be adapted to provide a maximum data rate of about 54 Mbps at a transmitter/receiver range of 12 meters (m) in a 300 MHz segmented bandwidth ranging from 5.150 GHz to 5.350 GHz and from 5.725 GHz to 5.825 GHz.

The 802.11 standard forms the basis of the other standards in the suite of specifications, and the 802.11b, 802.11a and 802.11g standards provide various enhancements and new features to their predecessor standards. Notwithstanding, there are certain elementary building blocks that are common to all the standards in the suite of specifications. For example, all the standards in the suite of specifications utilize the Ethernet protocol and utilize carrier sense multiple access with collision avoidance (CSMA/CA) for distribution coordination function (DCF) and point coordination function (PCF).

CSMA/CA utilizes a simple negotiation scheme to permit access to a communication medium. If a transmitting entity wishes to transmit information to a receiving entity, the transmitting entity may sense the communication medium for communication traffic. In a case where the communication medium is busy, the transmitting entity may desist from making a transmission and attempt transmission at a subsequent time. In a case where the communication transmission is not busy, then the transmitting entity may send information over the communication medium. Notwithstanding, there may be a case where two or more transmission entities sense that the communication medium is not busy and attempt transmission at the same instant. To avoid collisions and retransmissions, CSMA/CA or a ready to send (RTS) and clear to send (CTS) messaging scheme may be employed, for example. Accordingly, whenever a transmitting device senses that the communication medium is not busy, then the transmitting device may send a ready to send message to one or more receiving device. Subsequent to the receipt of the ready to send message, the receiving device may send a clear to send message. Upon receipt of the clear to send message by the transmitting device, the transmitting device may initiate transfer of data to the receiving device. Upon receiving packets or frames from the transmitting device, the receiving device may acknowledge the received frames.

The 802.11b standard, commonly called Wi-Fi, which represents wireless fidelity, is backward compatible with its predecessor standard 802.11. Although 802.11 utilizes phase-shift keying (PSK) as a modulation scheme, 802.11b utilizes a hybrid PSK scheme called complementary code keying (CCK). CCK permits higher data rate and particularly less susceptible to interference effects such as multipath-propagation interference, the PSK.

The 802.11a standard provides wireless asynchronous transfer mode (ATM) support and is typically utilized in access hubs. 802.11a utilizes orthogonal frequency-division multiplexing (OFDM) modulation/encoding scheme, which provides a maximum data rate 54 Mbps. Orthogonal frequency-division multiplexing is a digital modulation technique which splits a signal into several narrowband channels, with each channel having a different frequency. Each narrowband channel is arranged so as to minimize the effects of crosstalk between the channels and symbols in the data stream.

Since equipment designed to provide support for 802.11a operates at frequencies in the ranges 5.150 GHz to 5.350 GHz and from 5.725 GHz to 5.825 GHz, 802.11a equipment will not interoperate with equipment designed to operate with the 802.11b standard which defines operation in the 2.4 to 2.4835 GHz frequency band. One major drawback is that companies that have invested in 802.11b equipment and infrastructure may not readily upgrade their network without significant expenditure.

The 802.11g standard was developed as an extension to 802.11b standard. The 802.11g standard may utilize a similar OFDM modulation scheme as the 802.11a standard and delivers speeds comparable with the 802.11a standard. Since 802.11g compatible equipment operates in the same portion of the electromagnetic spectrum as 802.11b compatible equipment, 802.11g is backwards compatible with existing 802.11b WLAN infrastructures. Due to backward compatibility of 802.11g with 802.11b, it would be desirable to have an 802.11b compliant radio card capable of interfacing directly with an 802.11g compliant access point and also an 802.11g compliant radio card capable of interfacing directly with an 802.11 b compliant access point.

Furthermore although 802.11g compatible equipment operates in the 2.4 GHz to 2.4835 GHz frequency range, a typical transmitted signal utilizes a bandwidth of approximately 22 MHz, about a third or 30% of the total allocated bandwidth. This limits the number of non-overlapping channels utilized by an 802.11g access point to three (3). A similar scenario exists with 802.11b. Accordingly, many of the channel assignment and frequency reuse schemes associated with the 802.11b standard may be inherent in the 802.11g.

RF interference may pose additional operational problems with 802.11b and 802.11g equipment designed to operate in the 2.4 GHz portion of the electromagnetic spectrum. The 2.4 GHz portion of the spectrum is an unlicensed region which has been utilized for some time and is crowded with potential interfering devices. Some of these devices include cordless telephone, microwave ovens, intercom systems and baby monitors. Other potential interfering devices may be Bluetooth devices. Accordingly, interference poses interference problems with the 802.11 b and 802.11g standards.

802.11a compatible equipment utilizes eight non-overlapping channels, as compared to three non-overlapping channels utilized by 802.11b. Accordingly, 802.11a access points may be deployed in a more dense manner than, for example 802.11b compatible equipment. For example, up to twelve access points each having a different assigned frequency may be deployed in a given area without causing co-channel interference. Consequently, 802.11a may be particularly useful in overcoming some of the problems associated with channel assignment, especially in areas that may have a dense user population and where increased throughput may be critical. Notwithstanding, the higher operating frequency of 802.11a along with its shorter operating range, may significantly increase deployment cost since a larger number of access points are required to service a given service area.

In hybrid wired/wireless network systems that may utilize one or more protocols in the 802.11 suite of protocols, the mobility of access devices throughout the network may pose additional challenges for conventional switches and switching equipment. Since access devices are continuously changing their point of access to the network, conventional switches may not have the capability to control other network devices and/or entities to provide seamless communication throughout the network. Allocation and de-allocation of certain network resources can be challenging in a network in which the traffic dynamics are continuously changing. Moreover, particularly in network systems that may handle large volumes of access device traffic, providing adequate coverage while access devices are mobile within the network may be critical.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the invention provide a system and method for providing a mesh network using a plurality of access points. A method for providing a mesh network using a plurality of access points may include the step of coupling a first access point located in a first cell to at least a second access point located in a second cell. Service may be initially provided to an access device by a first access point located in the first cell. The access device may be serviced by a second access point located in a second cell whenever a signal for the access device falls below a specified threshold level. The second cell may be a neighboring cell, which may be located adjacent to the first cell.

A first signal may be transmitted from a first beamforming antenna to the second access point. The first beamforming antenna may be coupled to the first access point. Similarly, a second signal may be transmitted from a second beamforming antenna to the first access point. The second beamforming antenna may be coupled to the second access point. A path for facilitating transmission of the first signal between the first beamforming antenna and the second beamforming antenna may be an uplink channel. Also, a path for facilitating transmission of the second signal between the second beamforming antenna and the first beamforming antenna may be a downlink channel. The uplink channel and the downlink channel may be a backhaul channel.

The first access point located in a first cell may be coupled to a third access point located in the first cell. Accordingly, an access device may be serviced by a third access point located in the first cell whenever a signal level of the access device falls below a specified threshold level. Either of the first access point and the access device may be configured to determine when the signal of an access device falls below a specified threshold level.

Another embodiment of the invention may provide a machine-readable storage, having stored thereon a computer program having at least one code section adapted to facilitate communication in a mesh network using a plurality of access devices, the at least one code section being executable by a machine for causing the machine to perform the steps described above.

In another embodiment of the invention, a mesh network using a plurality of access points is provided. The system may include means for coupling a first access point located in a first cell to at least a second access point located in a second cell and means for providing service initially to at least one of a plurality of access devices by the a first access point located in the first cell. The invention provides a means for servicing an access device by a second access point located in the second cell whenever a signal for the access device falls below a specified threshold. In this regard, the second cell may be a neighboring cell located adjacent to the first cell.

The system may further include a first beamforming antenna coupled to the first access point for transmitting a first signal from the first access point to the second access point. A second beamforming antenna coupled to the second access point may be adapted to transmitting a second signal from a second access point to the first access point. A path for facilitating transmission between a first beamforming antenna and the second beamforming antenna may be an uplink channel. Similarly, a path for facilitating transmission between the second beamforming antenna and the first beamforming antenna may be a downlink channel. The uplink channel and the downlink channel may be a backhaul channel. The system may further include means for coupling the first access point located in a first cell to at least a third access point located in the first cell.

The system may further include means for servicing an access device by a third access point located in the first cell whenever a signal level corresponding to the access device falls below a specified threshold. Either of the first access point and/or an access device may include means for determining when a signal level corresponding to the access device falls below a specified threshold.

These and other advantages, aspects and novel features of the present invention, as well as details of an illustrated embodiment thereof, will be more fully understood from the following description and drawings.

DETAILED DESCRIPTION OF THE INVENTION

Aspects of the invention provide a system and method for providing a mesh network using a plurality of access points. A method for providing a mesh network using a plurality of access points may include the step of coupling a first access point located in a first cell to at least a second access point located in a second cell. Service may be initially provided to an access device by a first access point located in the first cell. The access device may be serviced by a second access point located in a second cell whenever a signal for the access device falls below a specified threshold level. The second cell may be a neighboring cell, which may be located adjacent to the first cell.

Figure 1A:
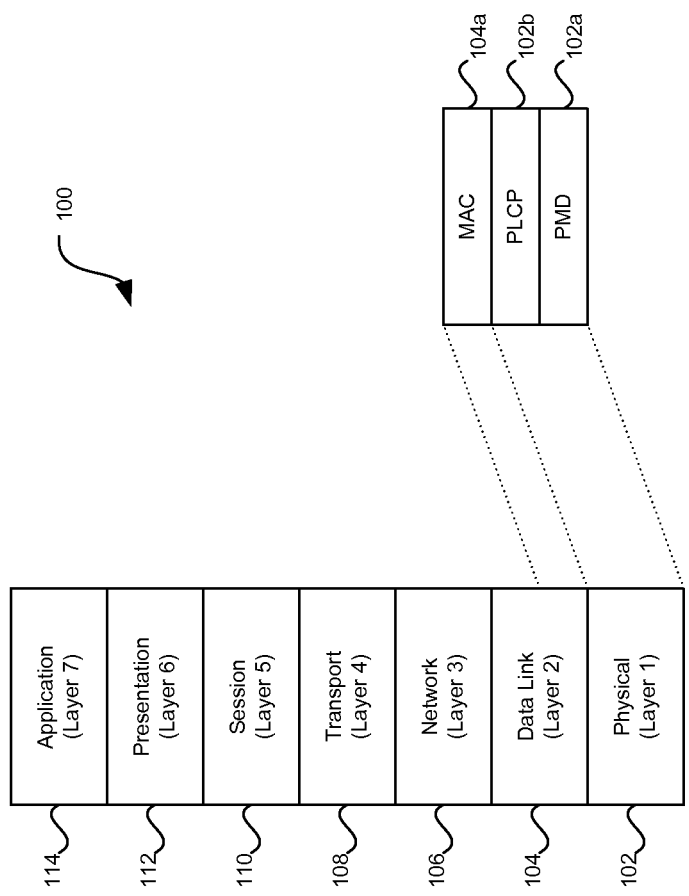
FIG. 1a is a block diagram of the OSI model.
Figure 1B:
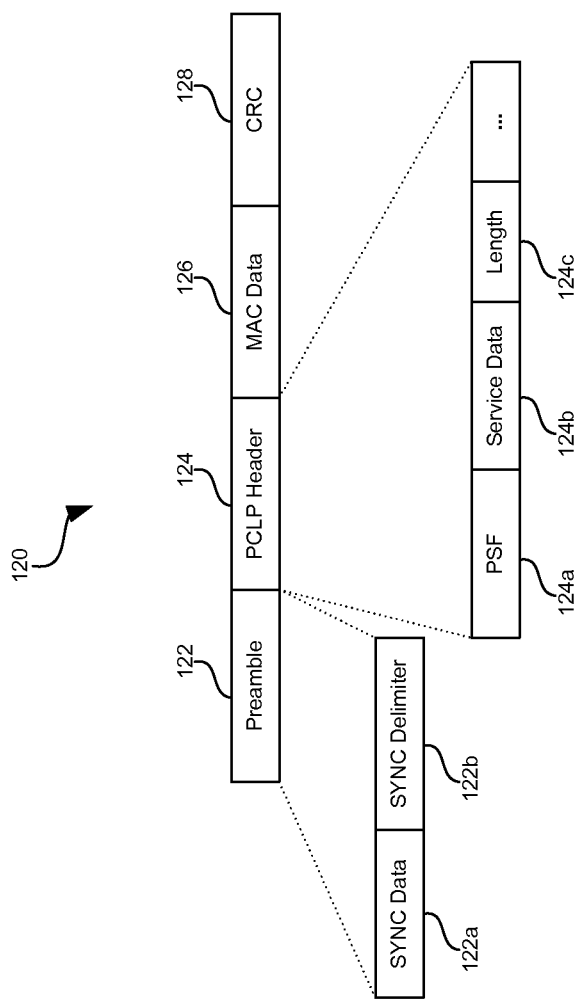
FIG. 1b is a block diagram illustrating a general PLOP frame as defined by 802.11.

FIG. 1b is a block diagram 120 illustrating a general PLOP frame as defined by 802.11. Referring to FIG. 1b, there is shown preamble 122, PLOP header 124, MAC data 126, and CRC 128. Preamble 122 may include synchronization (SYNC) data 122a and synchronization delimiter 122b. The PLOP header 124 may include, for example PLOP signal field (PSF) 124a, service data 124b, length 124c and other fields. The preamble 122 may be dependent on the PHY. The SYNC data 122a may include a unique bit stream that may be adapted to signal timing parameters such as the start of a frame. The SYNC data 122a is used for bit synchronization and demodulation. The SYNC delimiter 122b provides frame timing information and may be adapted to delimit the end of synchronization information. The PLOP header 124 may be adapted to contain information used for decoding the frame. For example, the PSF 124a may be adapted to include communication data rate information. The service data 124b is generally reserved, but may be utilized to provide application specific functionality. The length 124c may be adapted to indicate the length of the MAC data 126. In this regard, the length 124c may be expressed in terms of the time required to transmit the MAC data 126.

Figure 1C:
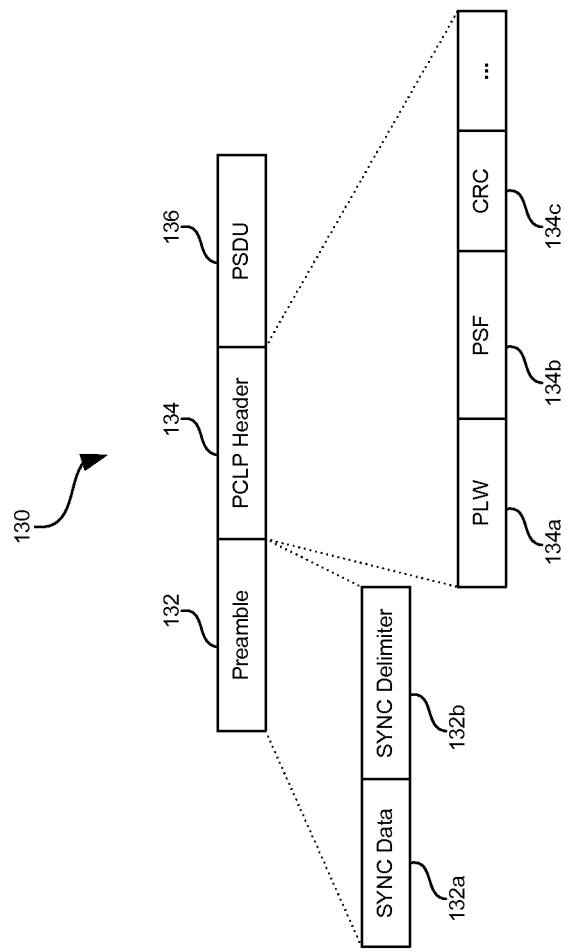
FIG. 1c is a block diagram illustrating a PLOP frame utilized by frequency hopping spread spectrum as defined by 802.11.

FIG. 1c is a block diagram 130 illustrating a PLOP frame utilized by frequency hopping spread spectrum as defined by 802.11. Referring to FIG. 1c, there is shown a SYNC data 132, PLOP header 134 and PSDU 136. The PLOP header 134 may include, for example, PSDU length word (PLW) 134a, PLOP signaling field (PSF) 134b, header error check field or CRC 134c and other fields. The PLW 134a may specify the number of octets contained in the PSDU 136. The PSF 134 be may be 4-bits in length and may be used to denote the communication data rate.

Figure 1D:
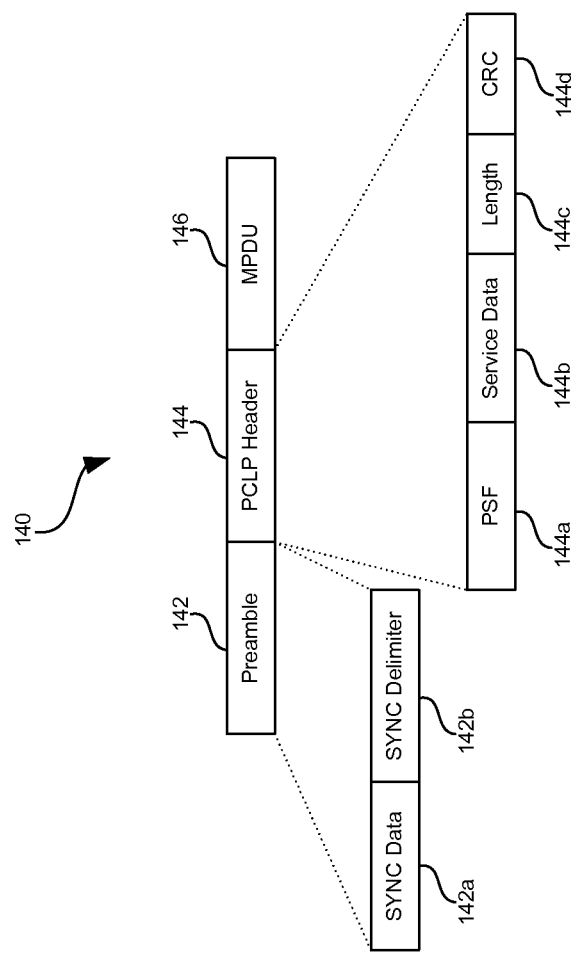
FIG. 1d is a block diagram illustrating a PLOP frame for direct sequence spread spectrum and high rate direct sequence spread spectrum as defined by 802.11.

FIG. 1*d* is a block diagram 140 illustrating a PLOP frame for direct sequence spread spectrum and high rate direct sequence spread spectrum (HR-DSS) as defined by 802.11. Referring to FIG. 1*d*, there is shown preamble 142, PLOP header 144 and MPDU 146. Preamble 142 may include synchronization (SYNC) data 142*a* and synchronization delimiter 142*b*. The PLOP header 144 may include PLOP signal field (PSF) 144*a*, service data 144*b*, length 144*c*, and CRC field 144*d*. The SYNC data 142*a* may be 128 bits as compared to 8 bits for SYNC data 132*a* for frequency hopping spread spectrum. The CRC 144*d* is 16 bits, which is similar to CRC 134*c* for frequency hopping spread spectrum.

Figure 1E:
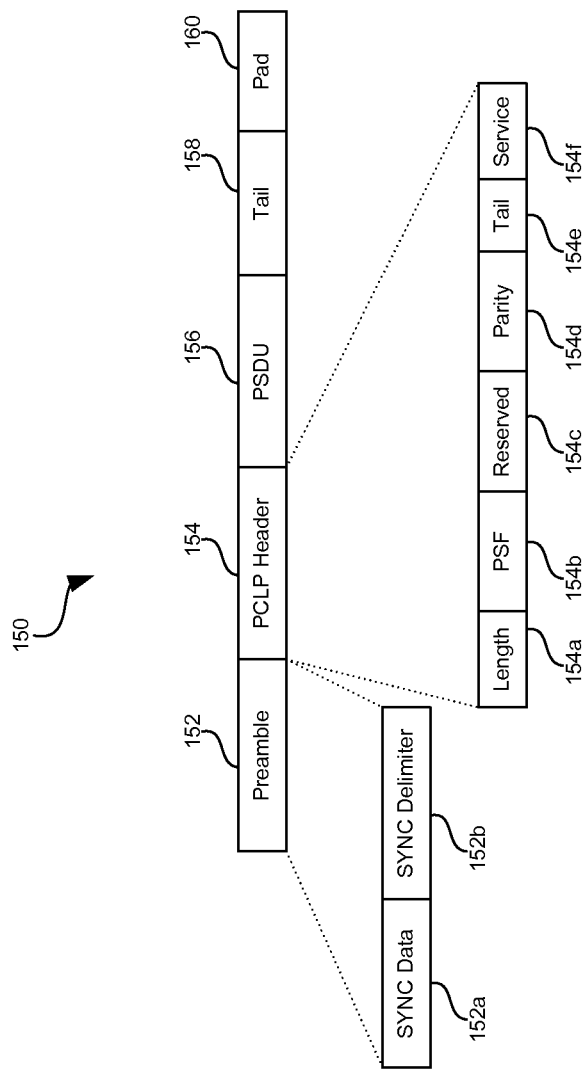
FIG. 1e is a block diagram illustrating a PLOP frame for orthogonal frequency division multiplexing as defined by 802.11.

FIG. 1*e* is a block diagram 150 illustrating a PLOP frame for orthogonal frequency division multiplexing as defined by 802.11. Referring to FIG. 1*e*, there is shown preamble 152, PLOP header 154 and PSDU 156, tail 158 and pad 160. Preamble 152 may include synchronization (SYNC) data 152*a* and synchronization delimiter 152*b*. The PLOP header 154 may include length 154*a*, PLOP signal field (PSF) 154*b*, reserved field 154*c*, parity 154*d*, tail 154*e* and service 154*f*. The length 154*a* is a 12-bit field that may be adapted to indicate the length of the frame. The PSF 154*b* is a 4-bit field that may indicate a modulation scheme utilized and its associated coding rate of the PSDU. For example, the specification utilizes binary 1011 to represent 6 Mbps, 1111 to represent 9 Mbps, 1010 to represent 12 Mbps, 1110 to represent 18 Mbps, 1001 to represent 24 Mbps, 1011 to represent 36 Mbps, 1000 to represent 48 Mbps and finally, 1100 to represent the maximum standardized rate if 54 Mbps. The reserved field 154*c* is a 1 bit field that is reserved for future use and may be adapted for application specific use. The parity field 154*d* may indicate odd or even parity. The tail field 154*e* is a 6-bit field. The service field 154*f* is a 16-bit field that may be adapted to indicate the type of service.

Figure 2:
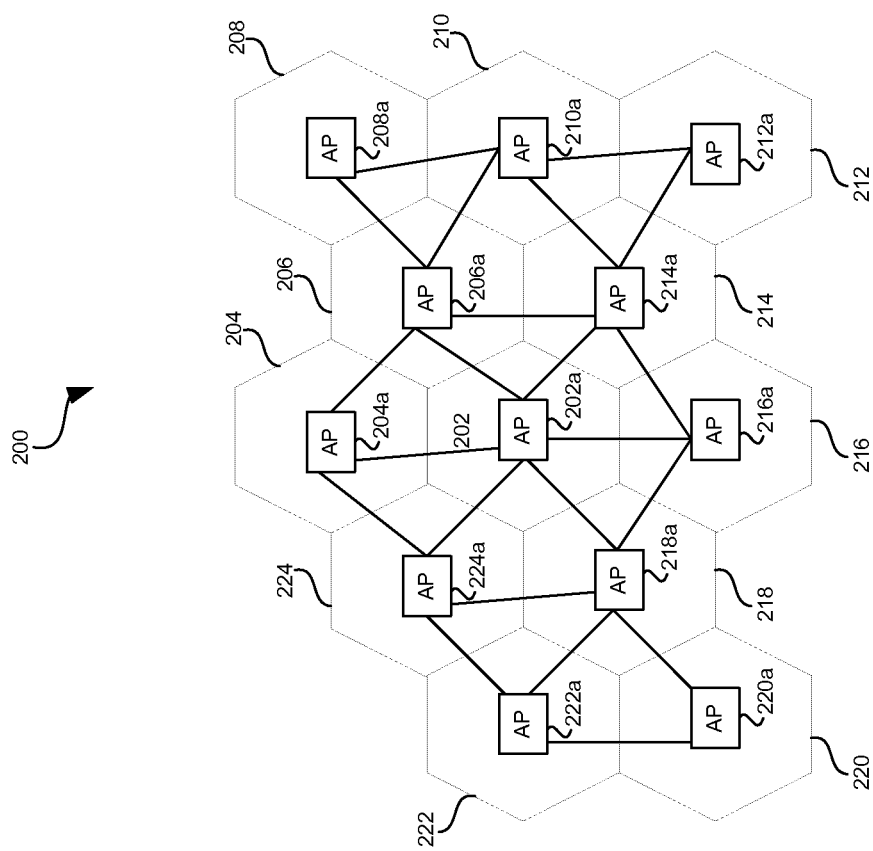
FIG. 2 is a block diagram of system for providing a mesh network using a plurality of wireless access points in accordance with an embodiment of the invention.

FIG. 2 is a block diagram of system 200 for providing a mesh network using a plurality of wireless access points (WAPs) in accordance with an embodiment of the invention. Referring to FIG. 2, there is illustrated a plurality of cells 202, 204, 206, 208, 210, 212, 214, 216, 218, 220, 222, 224, with each cell containing an access point (AP) 202*a*, 204*a*, 206*a*, 208*a*, 210*a*, 212*a*, 214*a*, 216*a*, 218*a*, 220*a*, 222*a*, 224*a*, respectively. It should be recognized that although each cell is illustrated as a hexagon, the actual shape of a cell may be dependent on various propagation and interference characteristics, and also geographical topology. Accordingly, the invention is not limited in this regard.

Each cell may represent a separate mesh network. For example, cell 220 may represent a first mesh network and cell 214 may represent a second mesh network. Within each cell or mesh network, there may be at least one access point which may be adapted to provide WLAN service within the cell. For example, access point 202*a* may be adapted to provide WLAN service within a coverage area indicated by cell 202. Similarly, access point 214*a* may be adapted to provide WLAN service within a coverage area indicated by cell 214.

In one embodiment of the invention, the range of an access point located within and serving a particular cell may be extended by interconnecting or coupling neighboring and surrounding cells. Cell 202, for example, has six (6) neighboring cells, namely 204, 206, 214, 216, 218, 224. Each of the access points 204*a*, 206*a*, 214*a*, 216*a*, 218*a*, 224*a* located in the cells 204, 206, 214, 216, 218, 224 respectively, may be adapted to provide WLAN service within a coverage area indicated by cell 204, 206, 214, 216, 218, 224, respectively. In accordance with an embodiment of the invention, the coverage area of access point 202 may be extended into any portion of any one or more of the neighboring cells 204, 206, 214, 216, 218, 224 by coupling the access points 204*a*, 206*a*, 214*a*, 216*a*, 218*a*, and 224*a*, to access point 202*a*. In a case where the access point 202*a* may be coupled to each one of access points 204*a*, 206*a*, 214*a*, 216*a*, 218*a*, 224*a*, then an access device located in any one of cells 202, 204, 206, 214, 216, 218, 224 may communicate with a device located in any one of the cells 202, 204, 206, 214, 216, 218, 224. For example, an access device located in cell 214 serviced by access point 214*a* may communicate with an access device located in cell 202 which may be serviced by access point 202*a*. Similarly, an access device located in cell 216 serviced by access point 216*a* may communicate with an access device located in cell 224 which may be serviced by access point 224*a*.

In another aspect of the invention, a mobile access device may actively roam from a first mesh network to a second mesh network. For example, an access device may move from a first mesh network represented by cell 216 into second mesh network represented by cell 202.

In accordance with another aspect of the invention, intra-mesh network and inter-mesh network hand-off may be provided. In the case of inter-mesh network handoff, an access device moving from a first cell representing a first mesh network may be handed off to a second cell representing a second mesh network. In the case of intra-mesh network handoff, an access device being serviced by a first access point located within a particular cell may be handed off to a second access point located within the same particular cell.

Figure 3:
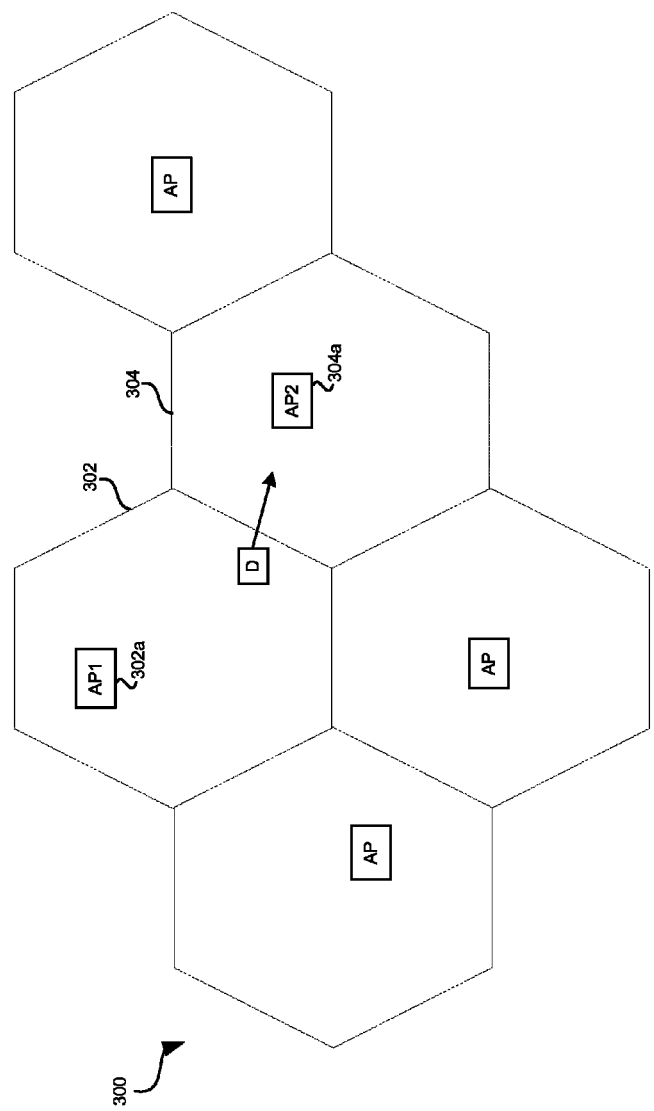
FIG. 3 is a block diagram of a inter-mesh network handoff in accordance with an embodiment of the invention.

FIG. 3 is a block diagram 300 of a inter-mesh network handoff in accordance with an embodiment of the invention. Referring to FIG. 3, there is shown a first cell 302 corresponding to a first mesh network having an access point AP1 302*a* and a second cell 304 corresponding to a second mesh network having an access point AP2 304*a*. Located in the first cell is an access device 306. Inter-mesh handoff may involve handoff from a first serving access point, for example access point 302*a*, to a second access point, for example access point 304*a*, both access points being located within different cells or on different mesh networks. For example, an inter-mesh network handoff may occur from access point 302*a* to 304*a*.

In operation, access point 302*a* may initially provide service to access device 306 which may be mobile within the cell 302. However, as access device 306 migrates to the fringe of the cell 302, a signal received from access point 302*a* may fade until it reaches, for example, a handover threshold. In one aspect of the invention, the handover threshold may be dependent on one or more signal parameters such as the signal strength received from one or more of access point 302*a* and access point 302*b*. The access device 306 may dynamically keep a record of the frequency and corresponding signal strength of any received channel it encounters. For example, the access device 306 may be adapted to actively scan a list of frequencies for available channels. The record of the frequency and corresponding signal strength of any received channel may serve as a handoff candidate list. The access device 306 may be adapted to select the best candidate for a handoff from the candidate list based on, for example, a channel having the strongest signal strength. In a case where the access device 306 determines that the best access point for a handoff is access point 304*a*, then the access device may tune it transceiver to an available transmit and/or receive channel corresponding to the access point 304*a*. At this point, the access point 304*a* provides service to the access device 306.

Figure 4:
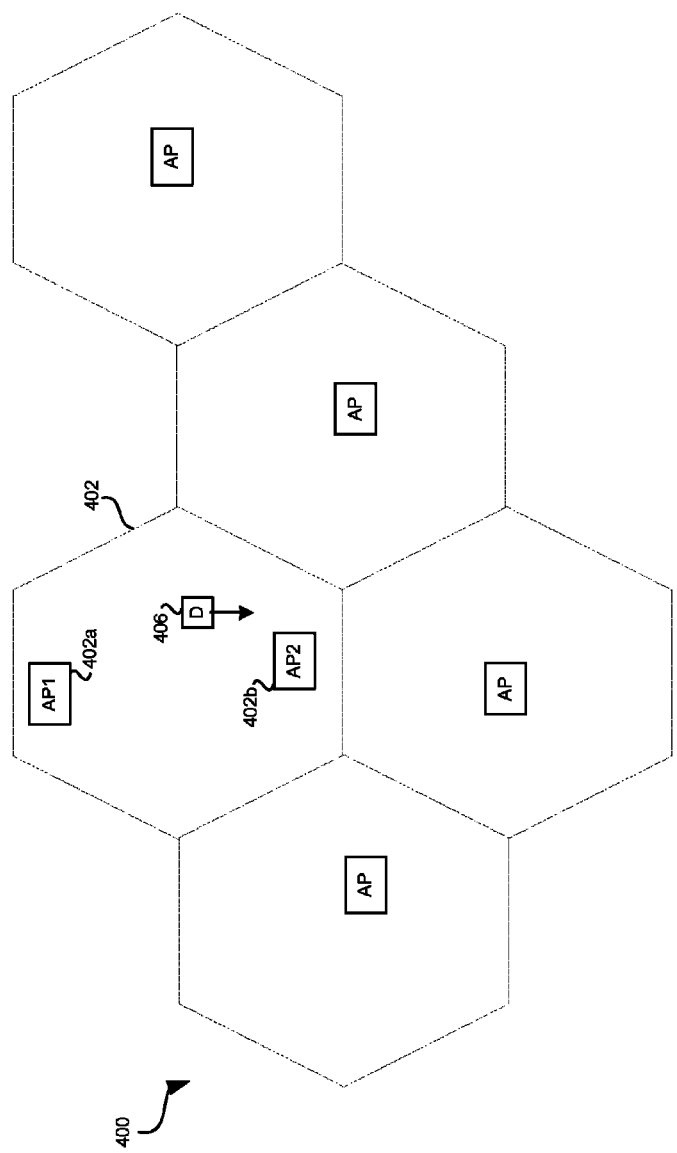
FIG. 4 is a block diagram of an intra-mesh network handoff in accordance with an embodiment of the invention.

FIG. 4 is a block diagram 400 of an intra-mesh network handoff in accordance with an embodiment of the invention. Referring to FIG. 4, there is shown cell 402 corresponding to a mesh network having a first access point AP1 402a and a second access point AP2 402b. Located in cell 402 is an access device 406. Intra-mesh handoff may include handoff from a first serving access point to a second access point, both access points being located within the same cell or on the same mesh network. For example, an intra-mesh network handoff may occur from access point 402a to 402b which may both be located in the same mesh network or cell.

In operation, access point 402a may initially provide service to access device 406 which may be mobile within cell 402. However, as access device 406 migrates away from access point 402a and towards access point 402b, a signal received from access point 402a may fade until it reaches, for example, a handover threshold. Simultaneous with the fading of the signal received from access point 402a, a signal having increasing signal strength may be received from access point 402b. The access device 406 may dynamically keep a record of the frequency and corresponding signal strength of any received channel it encounters including the frequencies and signal strength for available channels of access point 402b in its handoff candidate list. The access device 406 may be adapted to select the best candidate for a handoff from the candidate list based on, for example, a channel having the strongest signal strength. In a case where the access device 406 determines that the best access point for a handoff is access point 402b, then the access device 406 may tune its transceiver to an available transmit and/or receive channel corresponding to the access point 402b. At this point, the access point 402b provides service to the access device 406.

A client or access device may initiate dissociation when signal strength drops below a threshold level. The client may initiate re-association when a signal strength of the new access point is above a threshold level. The new access point may send a message to the current access point informing the switch of a possible association of the client with the new access point. The current access point may send a response to the new access point to handover session context data. The current access point may send, for example, a security block to the new access point. The new access point may acknowledge the receipt of the security block. The new access point may identify the new switch serving the access point of the move. The new switch may notify the current switch of the re-association. The current switch may respond to the new switch with switch filtering information.

An access device may initiate disassociation when signal strength falls below a specified threshold. The access device may initiate re-association when signal strength of a new access point is above a certain threshold. The new access point may send a message to the current AP to announce its re-association. The current access point may send a response to the new access point to handover session context data. The session data may be, for example, encryption data which may prevent re-authentication. The current access point may send a security block to the new access point. The new access point may acknowledge receipt. The new access point may notify a switch of the move. The switch may transfer filtering information from one port to another.

Figure 5:
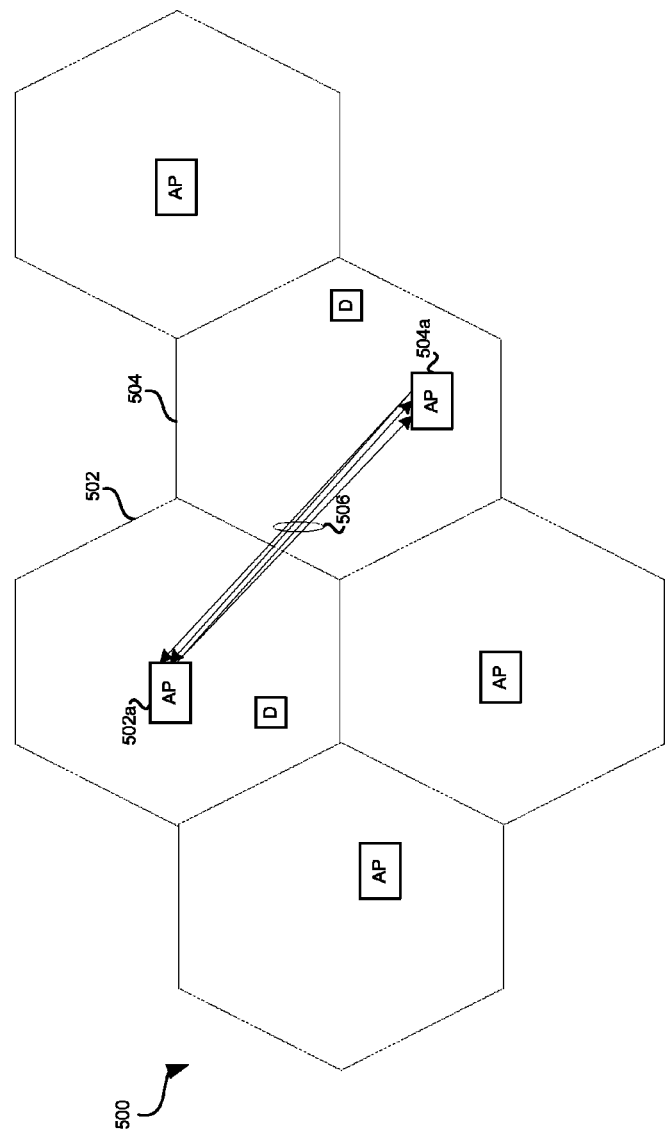
FIG. 5 is a block diagram of an exemplary system that utilizes beam forming in accordance with an embodiment of the invention.

In order to minimize the effects of interference, a beam forming technique may be utilized to provide communication between two or more access points co-located within the same cell or located within different cells or mesh networks. FIG. 5 is a block diagram of an exemplary system 500 that utilizes beam forming in accordance with an embodiment of the invention. Referring to FIG. 5, there is shown a first cell 502 having an access point 502a and an access device 502b located therein. A second cell 504 may have an access point 504a and an access device 504b located therein.

In an embodiment of the invention, a beam forming antenna associated with access point 502a may be adapted to provide communication with an access point 504b. In this regard, one or more transmit and receive frequencies may be assigned as communication channels to provide communication between access point 502a and access point 504a using the beam forming antenna path. The assigned channels may constitute a backbone channel 506. In one aspect of the invention, the backbone channel 506 may be adapted to utilize an 802.11b standard, while a mesh network 502 associated with access point 502a and a mesh network 504 associated with access point 504a may utilize an 802.11b or 802.1g standard. Accordingly, the backbone channel may provide a communication path that may reduce interference with other channels in a particular cell, thereby increasing transmission throughput. A plurality of access devices located in cell 502, for example access device 502b, may utilize channels other than those assigned to the backbone channel. Similarly, a plurality of access devices located in cell 504, for example access device 504b, may utilize channels other than those assigned to the backbone channel.

Figure 6:
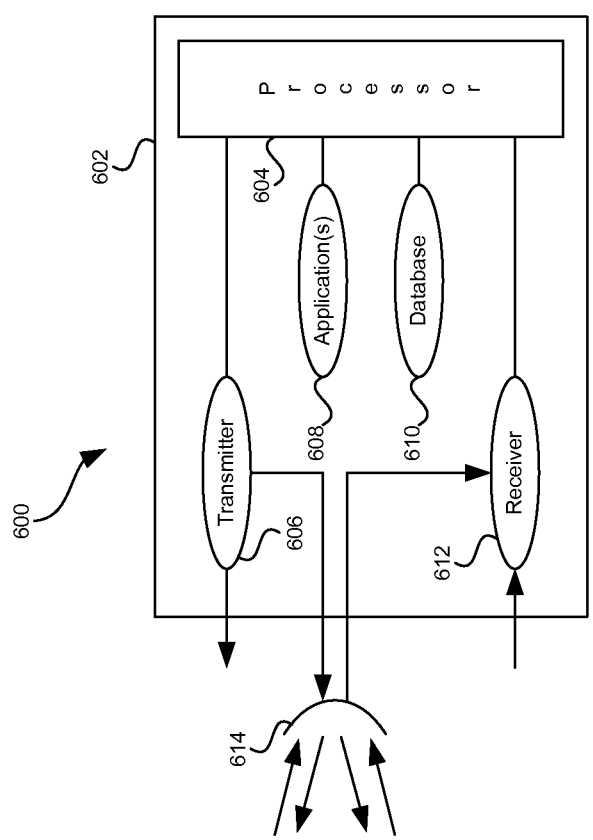
FIG. 6 is a block diagram of a system for providing a mesh network in accordance with an embodiment of the invention.

FIG. 6 is a block diagram of a system for providing a mesh network in accordance with an embodiment of the invention. Referring to FIG. 6, there is shown a processor 604, a transmitter 606, an application block 608, a database 610 and a receiver 612. Processor 604, transmitter 606, application block 608, database 610 and receiver 612 may be variously coupled to processor 604. The processor 604, transmitter 606 and receiver 612 may contain suitable logic and/or software that may be adapted to facilitate communication in a mesh network in accordance with the invention. FIG. 6 may also include a beamforming antenna 614. The beamforming antenna 614 may include a plurality of receiver antenna elements and transmitter antenna elements. Accordingly, each of the plurality of receiver antenna elements and transmitter elements may be adapted to function as a beamforming antenna. Database 610 may store applications and/or data that may be utilized by processor 606.

Processor 604, under control of one or more applications such as application 608, may be adapted to control transmitter 606 and receiver 608 to facilitate communication in a mesh network in accordance with an embodiment of the invention. Processor 604 may be adapted to control communication over a first access point located in a first cell, which may be coupled to a second access point located in a second cell. The processor 604 may be adapted to control receiver 612 and transmitter 606 to initially provide service to an access device by the first access point. The processor 604 may be configured to determine when a signal level of an access device falls below a specified threshold level. A second processor similar to processor 604, which may be associated with a second access point located within a second neighboring cell, may be configured to provide service to the access device. Accordingly, processor 604 may be adapted to terminate or discontinue serving the access device once the second processor starts to provide service to the access device.

Processor 604 may be adapted to control transmitter 606 to transmit a first signal from, for example, a first antenna element or sector of beamforming antenna 614. Similarly, processor 604 may be adapted to control receiver 612 to receive a second signal that may be transmitted from a second beamforming antenna coupled to the second access point. Alternatively, processor 604 may be adapted to control transmitter 606 to transmit a first signal via a wired connection coupling the first and second access points. Similarly, processor 604 may be adapted to control receiver 612 to receive a second signal that may be transmitted from the second access point to the first access point via a wired connection.

In accordance with various embodiments of the invention, dependent on the modulation scheme utilized, one or more of the PLOP frames illustrated in FIG. 1b, FIG. 1c, FIG. 1d and FIG. 1e may be adapted to contain information which may be utilized for providing communication between the plurality of access points in one or more mesh networks in accordance the embodiments of the invention. Additionally, the PLOP frames may be adapted to convey information for any one or more of the 801.11a, 802.11g and 802.11g modes of operation utilized by access points and/or access devices in accordance the embodiments of the invention.

A method for providing a mesh network using a plurality of access points may include the step of coupling a first access point located in a first cell to at least a second access point located in a second cell. Service may be initially provided to an access device by a first access point located in the first cell. The access device may be serviced by a second access point located in a second cell whenever a signal for the access device falls below a specified threshold level. The second cell may be a neighboring cell, which may be located adjacent to the first cell.

A first signal may be transmitted from a first beamforming antenna to the second access point. The first beamforming antenna may be coupled to the first access point. Similarly, a second signal may be transmitted from a second beamforming antenna to the first access point. The second beamforming antenna may be coupled to the second access point. A path for facilitating transmission of the first signal between the first beamforming antenna and the second beamforming antenna may be an uplink channel. Also, a path for facilitating transmission of the second signal between the second beamforming antenna and the first beamforming antenna may be a downlink channel. The uplink channel and the downlink channel may be a backhaul channel. A backhaul link or channel between mesh network access points may be utilize a higher data rate protocol than the individual mesh networks or cells. In this regard, the backhaul link or channel may utilize 802.11a while the individual cell may utilize 802.11g or 802.11g. Additionally, the backhaul channel or link may utilize long distance type wireless standards such as 802.16.

The first access point located in a first cell may be coupled to a third access point located in the first cell. Accordingly, an access device may be serviced by a third access point located in the first cell whenever a signal level of the access device falls below a specified threshold level. Either of the first access point and the access device may be configured to determine when the signal of an access device falls below a specified threshold level.

Accordingly, the present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

The invention claimed is:

1. A method for facilitating communication in a mesh network using a plurality of wireless access points, the method comprising:
    coupling a first wireless access point located in a first cell of the mesh network to at least a second wireless access point located in a second cell of the mesh network;
    providing service initially to at least one of a plurality of access devices in the mesh network by said first wireless access point located in said first cell, wherein said at least one of said plurality of access devices generates a handoff candidate list on its own without being prompted to do so by another access device; and
    servicing within the mesh network, said at least one of a plurality of access devices by said at least a second wireless access point located in said second cell, wherein whenever a signal for said at least one of a plurality of access devices falls below a specified threshold, said at least a second wireless access point is selected from said handoff candidate list.

2. The method according to claim 1, wherein said second cell is a neighboring cell located adjacent to said first cell.

3. The method according to claim 2, comprising transmitting a first signal from a first beamforming antenna coupled to said first wireless access point, to said at least a second wireless access point.

4. The method according to claim 3, comprising transmitting a second signal from a second beamforming antenna coupled to said at least a second wireless access point, to said first wireless access point.

5. The method according to claim 4, wherein a path for facilitating said transmitting said first signal between said first beamforming antenna and said second beamforming antenna is an uplink channel.

6. The method according to claim 5, wherein a path for facilitating said transmitting of said second signal between said second beamforming antenna and said first beamforming antenna is a downlink channel.

7. The method according to claim 6, wherein each of said uplink channel and said downlink channel comprises a backhaul channel.

8. The method according to claim 1, comprising coupling said first wireless access point located in said first cell to at least a third wireless access point located in said first cell.

9. The method according to claim 8, comprising servicing said at least one of a plurality of access devices by said at least a third wireless access point located in said first cell, whenever a signal for said at least one of a plurality of access devices falls below said specified threshold.

10. The method according to claim 9, wherein at least one of said first wireless access point and said at least one of said plurality of access devices determines when said signal for said at least one of a plurality of access devices falls below said specified threshold.

11. A non-transitory computer-readable medium, having stored thereon a computer program having at least one code section for facilitating communication in a mesh network using a plurality of wireless access points, the at least one code section being executable by a computer for causing the computer to perform the steps comprising:
coupling a first wireless access point located in a first cell of the mesh network to at least a second wireless access point located in a second cell of the mesh network;
providing service initially to at least one of a plurality of access devices in the mesh network by said first wireless access point located in said first cell, wherein said at least one of said plurality of access devices generates a handoff candidate list on its own without being prompted to do so by another access device; and
servicing within the mesh network, said at least one of a plurality of access devices by said at least a second wireless access point located in said second cell, wherein whenever a signal for said at least one of a plurality of access devices falls below a specified threshold, said at least a second wireless access point is selected from said handoff candidate list.

12. The non-transitory computer-readable medium according to claim 11, wherein said second cell is a neighboring cell located adjacent to said first cell.

13. The non-transitory computer-readable medium according to claim 12, comprising code for transmitting a first signal from a first beamforming antenna coupled to said first wireless access point, to said at least a second wireless access point.

14. The non-transitory computer-readable medium according to claim 13, comprising code for transmitting a second signal from a second beamforming antenna coupled to said at least a second wireless access point, to said first wireless access point.

15. The non-transitory computer-readable medium according to claim 14, wherein a path for facilitating said transmitting of said first signal between said first beamforming antenna and said second beamforming antenna is an uplink channel.

16. The non-transitory computer-readable medium according to claim 15, wherein a path for facilitating said transmitting of said second signal between said second beamforming antenna and said first beamforming antenna is a downlink channel.

17. The non-transitory computer-readable medium according to claim 16, wherein each of said uplink channel and said downlink channel comprises a backhaul channel.

18. The non-transitory computer-readable medium according to claim 11, comprising code for connecting said first wireless access point located in said first cell to at least a third wireless access point located in said first cell.

19. The non-transitory computer-readable medium according to claim 18, comprising code for servicing said at least one of a plurality of access devices by said at least a third wireless access point located in said first cell whenever a signal for said at least one of a plurality of access devices falls below said specified threshold.

20. The non-transitory computer-readable medium according to claim 19, wherein at least one of said first wireless access point and said at least one of said plurality of access devices comprises code for determining when said signal for said at least one of a plurality of access devices falls below said specified threshold.

21. A system for facilitating communication in a mesh network using a plurality of wireless access points, the system comprising:
at least one circuitry that couples a first wireless access point located in a first cell of the mesh network to at least a second wireless access point located in a second cell of the mesh network;
said at least one circuitry provides service initially to at least one of a plurality of access devices in the mesh network via said first wireless access point located in said first cell, wherein said at least one of said plurality of access devices generates a handoff candidate list on its own without being prompted to do so by another access device; and
said at least one circuitry facilitates servicing within the mesh network, of said at least one of a plurality of access devices by said at least a second wireless access point located in said second cell, wherein whenever a signal for said at least one of a plurality of access devices falls below a specified threshold, said at least a second wireless access point is selected from said handoff candidate list.

22. The system according to claim 21, wherein said second cell is a neighboring cell located adjacent to said first cell.

23. The system according to claim 22, comprising a first beamforming antenna coupled to said first wireless access point for transmitting a first signal from said first wireless access point to said at least a second wireless access point.

24. The system according to claim 23, comprising a second beamforming antenna coupled to said at least a second wireless access point for transmitting a second signal from said at least a second wireless access point to said first wireless access point.

25. The system according to claim 24, wherein a path for facilitating said transmitting between said first beamforming antenna and said second beamforming antenna is an uplink channel.

26. The system according to claim 25, wherein a path for facilitating said transmitting between said second beamforming antenna and said first beamforming antenna is a downlink channel.

27. The system according to claim 26, wherein each of said uplink channel and said downlink channel comprises a backhaul channel.

28. The system according to claim 21, wherein said at least one circuitry couples said first wireless access point located in said first cell to at least a third wireless access point located in said first cell.

29. The system according to claim 28, wherein said at least one circuitry services said at least one of a plurality of access devices via said at least a third wireless access point located in said first cell, whenever a signal for said at least one of a plurality of access devices falls below said specified threshold.

30. The system according to claim 29, wherein at least one of said first wireless access point and said at least one of said plurality of access devices determines when said signal for said at least one of a plurality of access devices falls below said specified threshold.

31. A method for communication, the method comprising:
in a mesh network comprising a first wireless access point and a second wireless access point, said first wireless access point being communicatively coupled to at least said second wireless access point, said first wireless access point being operable to provide:

initial servicing for one or more of a plurality of access devices in said mesh network, wherein said one or more of said plurality of access devices generates a handoff candidate list on its own without being prompted to do so by another access device; and wherein said second wireless access point services said one or more of said plurality of access devices in said mesh network whenever a corresponding signal for said at least one of said plurality of access devices falls below a specified threshold, and said second wireless access point is selected from said handoff candidate list.

32. The method according to claim 31, wherein said at least one of said plurality of access devices maintains said handoff candidate list.

33. The method according to claim 31, comprising transmitting a first signal from a first beamforming antenna coupled to said first wireless access point, to at least said second wireless access point.

34. The method according to claim 33, comprising transmitting a second signal from a second beamforming antenna coupled to at least said second wireless access point, to said first wireless access point.

35. The method according to claim 34, wherein a path for facilitating said transmitting said first signal between said first beamforming antenna and said second beamforming antenna is an uplink channel.

36. The method according to claim 35, wherein a path for facilitating said transmitting of said second signal between said second beamforming antenna and said first beamforming antenna is a downlink channel.

37. The method according to claim 36, wherein each of said uplink channel and said downlink channel comprises a backhaul channel.

38. The method according to claim 31, comprising coupling said first wireless access point located in a first cell to at least a third wireless access point located in said first cell.

39. The method according to claim 38, comprising servicing said at least one of a plurality of access devices by said at least a third wireless access point located in said first cell, whenever a signal for said at least one of said plurality of access devices falls below said specified threshold.

40. The method according to claim 39, wherein at least one of said first wireless access point and said at least one of said plurality of access devices determines when said signal for said at least one of said plurality of access devices falls below said specified threshold.

41. A non-transitory computer-readable medium, having stored thereon a computer program having at least one code section for communication, the at least one code section being executable by a computer for causing the computer to perform the steps comprising:

in a mesh network comprising a first wireless access point and a second wireless access point, said first wireless access point being communicatively coupled to at least said second wireless access point, said at least one code section causing said first wireless access point to provide:

initial servicing for one or more of a plurality of access devices in said mesh network, wherein said one or more of said plurality of access devices generates a handoff candidate list on its own without being prompted to do so by another access device; and wherein said second wireless access point services said one or more of said plurality of access devices in said mesh network whenever a corresponding signal for said at least one of said plurality of access devices falls below a specified threshold, and said at least a second wireless access point is selected from said handoff candidate list.

42. The non-transitory computer-readable medium according to claim 41, wherein said at least one of said plurality of access devices maintains said handoff candidate list.

43. The non-transitory computer-readable medium according to claim 41, comprising code for transmitting a first signal from a first beamforming antenna coupled to said first wireless access point, to at least said second wireless access point.

44. The non-transitory computer-readable medium according to claim 43, comprising code for transmitting a second signal from a second beamforming antenna coupled to at least said second wireless access point, to said first wireless access point.

45. The non-transitory computer-readable medium according to claim 44, wherein a path for facilitating said transmitting said first signal between said first beamforming antenna and said second beamforming antenna is an uplink channel.

46. The non-transitory computer-readable medium according to claim 45, wherein a path for facilitating said transmitting of said second signal between said second beamforming antenna and said first beamforming antenna is a downlink channel.

47. The non-transitory computer-readable medium according to claim 46, wherein each of said uplink channel and said downlink channel comprises a backhaul channel.

48. The non-transitory computer-readable medium according to claim 41, comprising code for coupling said first wireless access point located in a first cell to at least a third wireless access point located in said first cell.

49. The non-transitory computer-readable medium according to claim 48, comprising code for servicing said at least one of a plurality of access devices by said at least a third wireless access point located in said first cell, whenever a signal for said at least one of said plurality of access devices falls below said specified threshold.

50. The non-transitory computer-readable medium according to claim 49, wherein at least one of said first wireless access point and said at least one of said plurality of access devices determines when said signal for said at least one of said plurality of access devices falls below said specified threshold.

51. A system for communication, the system comprising:

in a mesh network comprising a first wireless access point and a second wireless access point, said first wireless access point being communicatively coupled to at least said second wireless access point, said first wireless access point comprising one or more circuits operable to provide:

initial servicing for one or more of a plurality of access devices in said mesh network, wherein said one or more of said plurality of access devices generates a handoff candidate list on its own without being prompted to do so by another access device; and wherein said second wireless access point services said one or more of said plurality of access devices in said mesh network whenever a corresponding signal for said at least one of said plurality of access devices falls below a specified threshold, and said at least a second wireless access point is selected from said handoff candidate list.

52. The system according to claim 51, wherein said at least one of said plurality of access devices maintains said handoff candidate list.

53. The system according to claim 51, wherein said one or more circuits is operable to transmit a first signal from a first beamforming antenna coupled to said first wireless access point, to at least said second wireless access point.

54. The system according to claim 53, wherein said one or more circuits is operable to transmit a second signal from a second beamforming antenna coupled to at least said second wireless access point, to said first wireless access point.

55. The system according to claim 54, wherein a path for facilitating said transmitting said first signal between said first beamforming antenna and said second beamforming antenna is an uplink channel.

56. The system according to claim 55, wherein a path for facilitating said transmitting of said second signal between said second beamforming antenna and said first beamforming antenna is a downlink channel.

57. The system according to claim 56, wherein each of said uplink channel and said downlink channel comprises a backhaul channel.

58. The system according to claim 51, wherein said one or more circuits is operable to couple said first wireless access point located in a first cell to at least a third wireless access point located in said first cell.

59. The system according to claim 58, wherein said one or more circuits enables servicing said at least one of a plurality of access devices by said at least a third wireless access point located in said first cell, whenever a signal for said at least one of said plurality of access devices falls below said specified threshold.

60. The system according to claim 58, wherein at least one of said first wireless access point and said at least one of said plurality of access devices determines when said signal for said at least one of said plurality of access devices falls below said specified threshold.

* * * * *